Jan. 15, 1924.                                                1,480,712
                    C. LE G. FORTESCUE
           PHASE CONVERTER FOR SINGLE PHASE CURRENTS
                     Filed Feb. 5, 1921

WITNESSES:                               INVENTOR
H. T. Shelhamer                       Charles Le G. Fortescue
O. B. Buchanan                              BY
                                       Wesley G. Carr
                                            ATTORNEY Patented Jan. 15, 1924.

1,480,712

UNITED STATES PATENT OFFICE.

CHARLES LE G. FORTESCUE, OF PITTSBURGH, PENNSYLVANIA, ASSIGNOR TO WESTINGHOUSE ELECTRIC & MANUFACTURING COMPANY, A CORPORATION OF PENNSYLVANIA.

PHASE CONVERTER FOR SINGLE-PHASE CURRENTS.

Application filed February 5, 1921. Serial No. 442,763.

*To all whom it may concern:*

Be it known that I, CHARLES LE G. FORTESCUE, a subject of the King of Great Britain, and a resident of Pittsburgh, in the county of Allegheny and State of Pennsylvania, have invented a new and useful Improvement in Phase Converters for Single-Phase Currents, of which the following is a specification.

My invention relates to phase-converting systems for single-phase currents, and it has particularly for its object to provide apparatus of the character designated that shall permit the generation of single-phase currents with apparatus of simple, compact and standard design without production of the troublesome heating and other stray-field effects which are commonly encountered in single-phase machines.

A further object of my invention is to devise a system, applicable to turbo-generators, which shall avoid the use of damper windings on the generator unit or units.

My invention has also for its object, the provision of a generator aggregate, comprising a plurality of polyphase machines, for generating single-phase currents.

Figure 1:
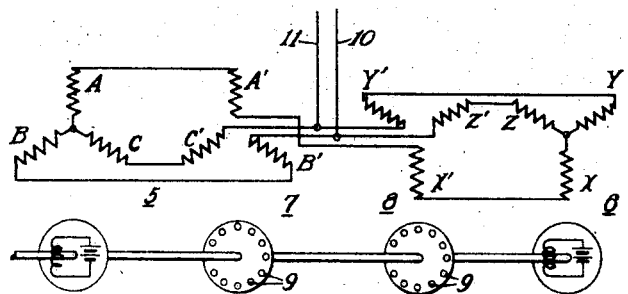
Figure 2:
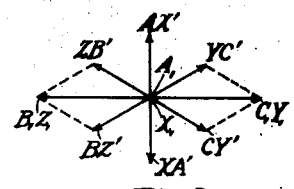
Figure 3:
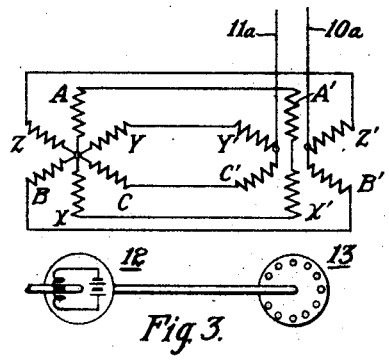
Figure 4:
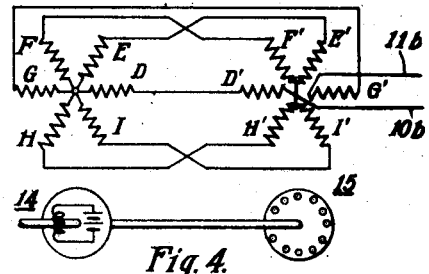
Figure 6:
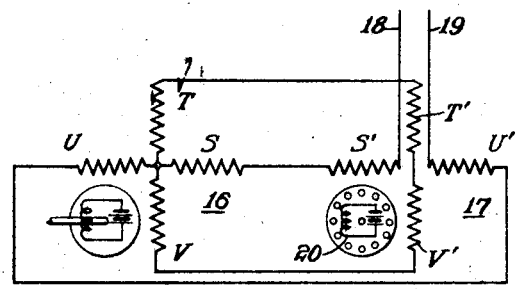
Figure 5:
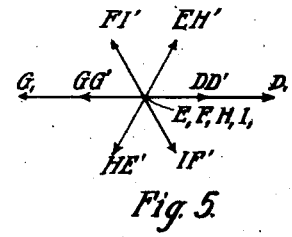

Other objects will be apparent from the following description and accompanying claims, when read in the light of the drawing, wherein, Figure 1 is a diagrammatic view of a plurality of dynamo-electric machines arranged to illustrate the principles of my invention, Fig. 2 is a vector diagram for the apparatus shown in Fig. 1, Fig. 3 is a diagrammatic view showing my invention as embodied in a pair of six-phase machines arranged to constitute an equivalent to the apparatus shown in Fig. 1, Fig. 4 is a diagrammatic view of a modified connection of said six-phase machines, Fig. 5 is a vector diagram for the apparatus shown in Fig. 4, and Fig. 6 is a diagrammatic view of my invention as embodied in a pair of quarter-phase machines.

It is well known that any oscillating function, such for example, as a single-phase electromotive force, may be considered as resolved into two oppositely rotating functions of equal magnitude, each of which has a maximum value equal to one-half the maximum value of the original oscillating function.

Conversely, any two oppositely rotating systems of equal magnitude may be combined to establish a single oscillating function having a maximum value equal to twice the maximum values of the rotating functions.

Similarly, it may be pointed out that a pulsating power, such as that required by a single-phase current, may be supplied by means of a combination of a continuous source of power, such as a symmetrical polyphase generator of given phase-sequence and an alternating source of power which may consist of a similar machine having the opposite phase-sequence.

I make use of the last-mentioned fact in order to produce a single-phase alternating electromotive force for supply to consumption circuits by the combination of two polyphase systems of opposite phase sequence. I thus avoid the serious heating and vibrating difficulties encountered in the ordinary single-phase generator because of the pulsating generator reaction. I am also able to derive the single-phase electromotive force from machines which are, at all times, balanced in their loading conditions and subject to substantially constant magnetic conditions.

In my prior application, Serial No. 206,932, filed Dec. 13, 1917, I disclose means whereby the phase-sequence of the output electromotive forces of a polyphase source, such as a generator or a converter, is reversed to have the same phase-sequence as the unbalancing electromotive force imposed on the system by a single-phase load or other means. Thus, a polyphase generating device is secured which maintains its balance for widely varying load conditions.

Furthermore, in my copending application, Serial No. 254,312, filed Sept. 16, 1918, I disclose a system whereby a single-phase electromotive force is generated for supply to a consumption circuit by the composition of two polyphase systems of opposite phase-sequence, use being made of special transformers to effect this combination.

By the present invention, I generate a single-phase electromotive force in a similar manner but am able to use standard transformers and thus am able to obtain the same effect in a simpler and cheaper manner.

In its broadest aspects, therefore, the present application is a continuation, in part, of said copending application, Serial No. 254,312.

By suitable modification in the design of the generating machine, the field members and portions of the armature windings may be consolidated, and thus the effects of a relatively complicated aggregation of machines may be secured with a relatively small structure.

In my copending application, Serial No. 258,578, filed Oct. 17, 1918, I disclose means whereby a series balancer machine is employed in a polyphase system, this machine having a phase-sequence opposite to that of the system, and offering an infinite synchronous impedance to the flow of undesired unbalancing currents having a reversed phase-sequence. According to my present invention, I employ one or more series balancer machines of the above-mentioned character, in conjunction with one or more polyphase generators, to produce two polyphase systems having different phase-sequences, or to produce a single polyphase system interchanging power with a single-phase system, and, at the same time, having closed-circuit paths providing for the flow of balanced polyphase currents.

Referring to the accompanying drawing for a more detailed understanding of my invention, I show two similar polyphase generators at 5 and 6 in Fig. 1, the generators being illustrated as three-phase, star-connected machines. A series balancer machine 7, having distinct three-phase primary windings, is connected directly in series with the respective phase windings of the machine 5, and a similar series balancer machine 8 is connected, in a similar manner, with respect to the machine 6.

Each of the series balancer machines 7 and 8 is provided with a rotor member having a good damper winding 9 which rotates, at substantially synchronous speed, in a direction opposite to the field which is set up by the positive-phase-sequence currents in the primary member. The damper windings, therefore, rotate at substantially double-synchronous speed with respect to the positive-phase-sequence primary currents and carry double-frequency currents which act strongly to neutralize the field set up by said positive-phase-sequence currents. Consequently, the series balancers offer only a negligible impedance to said positive-phase-sequence currents, whereas they offer an extremely high or synchronous impedance to primary currents of negative-phase-sequence. The rotors of all four machines may be mounted upon a common shaft, to be driven by a prime mover (not shown). The desired phase-sequences of the stator windings are secured by connecting the same in the proper order, as indicated. It will be understood, however, that the auxiliary machines may be separately driven, or may be left to run by themselves when once started in the proper direction. The numbers of poles in the auxiliary machines may also be different from those of the generating machines, in order that they may run at different speeds, if desired.

The auxiliary machines may also be provided with direct-current exciting windings for taking up the small magnetizing currents which would otherwise flow in the primary windings, as is shown, for example, in Fig. 6.

The voltage conditions will be understood by reference to the vector diagram of Fig. 2. The voltage vectors for the two generating machines 5 and 6 are indicated at A, B, C and X, Y, Z, respectively, and the corresponding voltage vectors of the series balancer machines are indicated at A', B', C' and X', Y', Z', respectively. The windings in Fig. 1 are similarly lettered and are drawn, in phase and magnitude to correspond to the respective electromotive forces. The windings of the balancer machines in Fig. 1 are displaced 180° with respect to their vectors in Fig. 2, since the currents are flowing inwardly in said windings instead of outwardly, as in the generating machines.

The electromotive forces of the auxiliary balancers 7 and 8 have a phase-sequence opposite to that of the respective generator machines and are determined, in both phase and magnitude, by the electromotive forces impressed thereon.

The auxiliary balancers 7 and 8 have their primary phase windings A', B', C' and X', Y', Z' connected in series respectively, with the correspondingly lettered phase windings of the generating machines 5 and 6. The terminals of the windings A', B', C' are connected to the terminals of the windings X', Z', Y' in the order mentioned. A single-phase system, indicated by the conductors 10 and 11, is connected to terminals of windings B', Z' and C', Y', respectively.

It will be noted that, if the voltage vectors A' and X' are equal and opposite, respectively, to voltage vectors A and X, the series balancers will neutralize the voltages of their respective generators to form zero resultant voltages $A_1$ and $X_1$ in the phases mentioned. The remaining voltages B', C' and Y', Z' will then combine with the correspondingly lettered voltages of the generators to produce resultant coincident voltages $B_1-C_1$ and $Z_1-Y_1$, respectively.

Considering the voltages A', B', C' and X', Y', Z' it is apparent that, where the auxiliary machines 7 and 8 are substantially synchronously running induction machines with respect to the voltages mentioned, the voltage generated will automatically adjust themselves to such value that the resultant electromotive forces of the circuits are zero. In other words, the generated electromotive force of auxiliary balancers, such as machines 7 and 8, are not fixed in phase or magnitude but depend solely upon the impressed voltages.

Where the auxiliary machines 7 and 8 are synchronously running and separately excited machines, the excitation may be adjusted to the exact value of the voltage required, and the proper adjustment of phases will take place automatically, provided that there is provision for a relative angular adjustment between the rotor of the auxiliary machine and its corresponding generator machine. However, should the excitation fail to give the exact value of voltage, small magnetizing negative-phase-sequence currents will flow to adjust the generated voltage to the proper value.

In opening the discussion of the auxiliary balancer electromotive forces above, it was assumed that the voltages A' and X' were equal and opposite, respectively, to the voltages A and X, and the conditions which would result from such assumption were investigated. If $C_1—B_1$ or $Y_1—Z_1$ is the back electromotive force of the single-phase load 10, 11, it will be apparent that the voltages of all the circuits will add to zero, thus proving the accuracy of the assumption.

The machine 6 may be consolidated with the machine 5 to form a single resultant machine 12, as indicated in Fig. 3, and, similarly, the machines 7 and 8 may be consolidated to form a single resultant machine 13. The phase windings of the machines that are consolidated into opposite machines are indicated in Fig. 3 by the same letters that are employed in Fig. 1. It will be observed that the machines 12 and 13 are, in effect, six-phase machines.

The machine 12 is similar to an ordinary six-phase machine, and the machine 13 differs therefrom only in having the phase-winding C' connected to the phase winding Y' rather than to the diametrically opposite phase winding Z', and in having the phase winding B' connected to the phase winding Z' rather than to the diametrical opposite phase winding Y'. One single-phase lead 10a is connected to the junction of the phases B' and Z', and the other single-phase lead 11a is connected to the junction of phases C' and Y'.

The vector diagram of Fig. 2 applies also to the apparatus of Fig. 3. In fact, the two three-phase generators of Fig. 1 constitute merely a special case of means for generating six-phase voltages.

Fig. 4 shows another connection of the primary windings of a pair of six-phase machines, here indicated as 14 and 15. The phase windings of the generator machine 14 are lettered, in the counterclockwise direction, D, E, F, G, H, I. The phase windings of the balancer machine 15 are lettered, in the clockwise direction, D', F', E', G', I', H'.

The windings of the balancer machine are connected in series, respectively, with the correspondingly lettered windings of the generator machine, with the windings D, D' and G, G' so connected that their electromotive forces add to give the resultant single-phase electromotive force $D_1—G_1$. The terminals of the windings E' and F' are connected together, and the terminals of the windings H' and I' are similarly connected. The pairs of connected terminals may be also connected together as indicated.

It will be observed that the voltage induced in phases E', F', H' and I' of the negative-phase-sequence machine exactly neutralize the voltage generated in the correspondingly lettered phases of the generator, giving zero resultant voltages $E_1$, $F_1$, $H_1$ and $I_1$. The single-phase load, 10b, 11b, is connected to the terminals of phase windings D' and G', respectively.

Up to this point, only the voltage vectors have been considered. It has been pointed out that the auxiliary balancer machines induce a negligible positive-phase-sequence electromotive force, but generate an extremely high or synchronous negative-phase-sequence electromotive force which is equal and opposite to the impressed negative-phase-sequence electromotive force.

Considering the currents, it will be seen that the negative-phase-sequence currents flowing through the series balancer machines will be negligible, being merely sufficient to supply such magnetizing currents in the primary windings of the balancer machines as may be required. By the expression negative-phase-sequence currents, I mean currents flowing from the generator machines and having a phase-sequence opposite to the phase-sequence of the generated voltages thereof, the latter being presumed to have the positive-phase-sequence. The positive-phase-sequence currents flowing through the series balancers encounter negligible impedance as pointed out above, and hence do not suffer any phase distortion in passing through said series balancers.

Assuming that the single-phase currents are of unity power factor, the single-phase current vector will coincide with the voltage vector $B_1—C_1$ or $Z_1—Y_1$. The currents flowing in phases B, C, Y and Z will also be in phase with their respective voltage vectors. The currents B and Z combine to form a resultant current which is in phase with the vector $B_1$ or $Z_1$, and the currents in phases C and Y similarly combine to form a resultant which is in phase with the vector $C_1$ or $Y_1$.

It will thus be seen that, while single-phase currents are flowing in the conductors 10 and 11, the polyphase currents of the generators are all in phase with their respective voltages. If the single-phase current is displaced from the single-phase-electromotive-force vector, the polyphase currents will be similarly displaced from their vectors, thus giving resultant currents which unite to form the single-phase current.

If one of the generators, as 6, were omitted, together with its series balancer, as 8, and the free terminal of the neutralized voltage winding A' were connected to the neutral point of the generator windings A, B, C, the currents flowing in the phases B and C would be in phase with each other, thus giving unsymmetrically distributed currents in the generator. A similar unsymmetrical current distribution is obtained with all generators having an odd number of phases, unless the neutralized voltage terminal is connected to a neutral point obtained by another machine, as indicated above, or by means of transformer windings connected across the single-phase load, as shown, for example, in my hereinbefore mentioned application, Serial No. 206,932.

From the foregoing discussion, it is evident that the single-phase circuit must be connected across phases that are symmetrically disposed with respect to a diameter. In Figs. 1 and 3 the phases B, Z and C, Y, which are connected to the single-phase line, are symmetrically disposed with relation to the diameter normal to A—X. In Fig. 4, the phases D, G, which are connected to the single-phase line, are diametrically opposite.

Where the generator has an even number of phases, a single generator unit only is required, the series balancer being connected either in the negative-phase-sequence, as indicated in Fig. 3, or, in general, in any phase-sequence in which the resultant voltages are all zero, except two which are in phase to produce a single-phase voltage.

In either connection of the series balancer, the phases in which the resultant voltage is zero are close-circuited in order to provide a return path for the currents. The return path is essential, since the balancer machine permits the flow of only balanced currents, and would not permit current-flow in the phases connected to the single-phase circuit if current-flow in the other phases were made impossible by reason of an open circuit. In Fig. 1, the return path for the phases in which the resultant voltage is zero is from the neutral point of the machine 5, through phase windings A, A', X', X, to the neutral point of the machine 6.

Fig. 6 shows a particularly advantageous embodiment of my invention in a quarter-phase generator 16 and a quarter-phase series balancer 17. The phase windings S', T', U', V', of the balancer are connected, in negative phase sequence, in series with the correspondingly lettered phase windings of the generator, in such manner that the electromotive forces T, T', and V, V', respectively, neutralize each other, while the electromotive forces of windings of S, S' and U, U', respectively, add to produce a single-phase voltage for the single-phase line, 18, 19.

The rotors of the two machines are here shown without a mechanical connection therebetween. If desired, a unidirectional current winding 20 may be mounted on the secondary member of the series balancer in order to cause it to run at exactly synchronous speed, although this feature is not absolutely necessary.

I wish it to be understood that the operations described above are all reversible. In other words, my invention is not limited to the generation of single-phase currents by means of polyphase generators, but is of general application to the interchange of power in either direction between a single-phase line and a polyphase line. In Fig. 1 the voltages of the generator machines 5 and 6 may be derived, by means of a six-phase transformer connection, from a three-phase line. In Figs. 3, 4 and 6, the machines designated hereinbefore as generator machines may be typical of any polyphase translating device or devices, interchanging power, in either direction with the single-phase line.

While I have shown my invention in its preferred form, it will be obvious to those skilled in the art that it is not so limited but is susceptible of various minor changes and modifications without departing from the spirit thereof. I desire, therefore, that only such limitations shall be placed thereupon as are imposed by the prior art or are specifically set forth in the appended claims.

I claim as my invention:

1. In a converting system for single-phase currents, the combination with two main polyphase translating devices connected to a common single-phase circuit, of a balancer mechanism connected in series with each translating device and having the opposite phase-sequence with respect thereto to offer an extremely high synchronous impedance to the flow of unbalancing polyphase currents of reverse phase-sequence to the associated translating device.

2. In a converting system for single-phase currents, the combination with two main polyphase dynamo-electric mechanisms connected to a common single-phase circuit, of a balancer mechanism connected in series with each dynamo-electric mechanism and having the opposite phase-sequence with respect thereto to offer an extremely high synchronous impedance to the flow of unbalancing polyphase currents of reverse phase-sequence to the associated dynamo-electric mechanism, the two balancer mechanisms being constructed as a single machine, and the two polyphase dynamo-electric mechanisms being constructed as a single machine.

3. The combination with a polyphase system having an even number of phases, of a series balancer machine having polyphase primary windings connected in series with the respective phases of said polyphase system, said series balancer machine having also a good damper winding rotating at approximately synchronous speed, in the backward direction with respect to the field set up by the positive-phase-sequence currents flowing through said primary windings, and means for close-circuiting certain phases having zero resultant voltage.

4. The combination with a polyphase system having an even number of phases, of a series balancer machine having polyphase primary windings connected in series with the respective phases of said polyphase system, said series balancer machine having also a closed-circuited polyphase secondary winding rotating at substantially synchronous speed, the connections of the primary phase windings of said series balancer machine being in such order that the resultant voltages across certain phases are zero, whereas the resultant voltages across the remaining phases produce a single-phase voltage, close-circuiting means for said phases having zero resultant voltage, and a single-phase system connected to said phases having a resultant single-phase voltage.

5. A converting system for single-phase electromotive forces, comprising a plurality of polyphase machines, certain of said machines operating as mechanism for translating electrical and mechanical energy and other of said machines being provided with synchronously running damper windings and operating as series balancing mechanism, the last mentioned mechanism having primary phase windings connected in series with the respective translator mechanism in such manner that the resultant voltages in certain phases are zero, whereas the resultant voltages in the remaining phases produce a single-phase voltage, and said connections being such also that the currents in the translator mechanism are symmetrically distributed.

6. The combination with a polyphase system having an even number of phases, of a single-phase system, dynamo-electric balancing means connecting said systems for the interchange of power, said means permitting the flow of only balanced polyphase currents, said single-phase system being connected across phases disposed symmetrically with respect to a diameter, and means for close-circuiting the remaining phases.

7. The combination with a single-phase system, of two three-phase systems, balancing mechanism said mechanism comprising a three-phase primary winding connected in series with each of said three-phase systems, and damping secondary windings cooperating with said primary windings and rotating backwardly at approximately synchronous speed, connections between said single-phase system and two phases of each of said three-phase systems, and connections between the two remaining phases of the respective three-phase systems.

8. The combination with a single-phase system, of a polyphase system having an even number of phases, a series balancer machine having polyphase primary windings connected in series with the respective phases of said polyphase system, said series balancer machine having also damping secondary windings rotating backwardly at approximately synchronous speed, connections between said single-phase system and certain phases of said polyphase system, the remaining phases of said polyphase system having a substantially zero resultant voltage, and close-circuiting connections for said remaining phases, said several connections being symmetrically arranged that balanced polyphase currents may flow through said polyphase system while interchanging power with said single-phase system.

9. The combination with a single-phase system, of a six-phase system, backwardly rotating dynamo-electric means connected in series with said six-phase system for substantially preventing the flow of unbalancing component currents, and symmetrical connecting means for close-circuiting certain diametrically related phases of said six-phase system and for connecting the remaining phases to said single-phase system for interchanging power between said systems.

10. The combination with a plurality of dynamo-electric machines, of a polyphase system, said machines being connected in symmetrical relation to different conductors of said polyphase system, and means for causing the flow of only symmetrical polyphase currents in said conductors.

11. The combination with a plurality of dynamo-electric machines, of a polyphase system, said machines being connected in symmetrical relation to different conductors of said polyphase system, and dynamo-electric means connected in series with said conductors for providing a path for the flow of only symmetrical polyphase currents in said conductors.

12. The combination with a single-phase system, of a six-phase system, dynamo-electric means connected in series with said six-phase system for substantially preventing the flow of unbalancing component currents, symmetrical connecting means for close-circuiting certain diametrically related phases of said six-phase system and for connecting the remaining phases to said single-phase system for interchanging power between said systems, and a pair of three-phase machines connected in symmetrical relation to different phases of said six-phase system.

In testimony whereof, I have hereunto subscribed my name this first day of February, 1921.

CHARLES LE G. FORTESCUE.